United States Patent [19]

Breyer

[11] Patent Number: 5,024,003
[45] Date of Patent: * Jun. 18, 1991

[54] WORK-CONTACTING PROBE SYSTEM FOR A COORDINATE-MEASURING INSTRUMENT

[75] Inventor: Karl-Hermann Breyer, Heidenheim, Fed. Rep. of Germany

[73] Assignee: Carl-Zeiss-Stiftung, Heidenheim/Brenz, Oberkochen, Fed. Rep. of Germany

[ * ] Notice: The portion of the term of this patent subsequent to Apr. 17, 2007 has been disclaimed.

[21] Appl. No.: 505,905

[22] Filed: Apr. 5, 1990

Related U.S. Application Data

[63] Continuation of Ser. No. 234,510, Aug. 22, 1988, Pat. No. 4,916,825.

[30] Foreign Application Priority Data

Aug. 27, 1987 [DE] Fed. Rep. of Germany ....... 3728578

[51] Int. Cl.⁵ .............................................. G01B 7/28
[52] U.S. Cl. ........................................ 33/561; 33/559; 33/556
[58] Field of Search ................ 33/556, 557, 558, 559, 33/560, 561, 572, 832, 501, 502

[56] References Cited

U.S. PATENT DOCUMENTS

| | | | |
|---|---|---|---|
| 3,209,460 | 10/1965 | Eisele | 33/556 |
| 4,549,356 | 10/1985 | Ernst | 33/556 |
| 4,637,119 | 1/1987 | Schneider et al. | 33/561 |
| 4,713,892 | 12/1987 | Strauss | 33/556 |
| 4,716,657 | 1/1988 | Collingwood | 33/561 |
| 4,738,033 | 4/1988 | Ferber et al. | 33/559 |
| 4,784,539 | 11/1988 | Lehmkuhl | 33/558 |
| 4,785,545 | 11/1988 | Aubele | 33/557 |
| 4,815,214 | 3/1989 | Enderle et al. | 33/561 |

FOREIGN PATENT DOCUMENTS 2136573 9/1984 United Kingdom ................. 33/503

Primary Examiner—Thomas B. Will
Attorney, Agent, or Firm—Hopgood, Calimafde, Kalil, Blaustein & Judlowe

[57] ABSTRACT

A work-contacting probe system is selectively operable as a single-stage or as a two-stage system. The system consists of a first central probe head of large diameter and of one or more small or auxiliary probe heads of dimensions which are reduced as compared with the first probe head. The small probe head can be selectively accommodated, in substitution of a rigid probe pin on the probe-chucking receptacle of the central probe head. Upon substitution of the auxiliary probe-head system for a rigid probe pin, associated electronic circuitry automatically responds to the fact of substitution, (1) by substantially increasing spring-preload force on the probe-chucking receptacle of the central probe head, thereby converting the central probe head for collision-detection service, while (2) connecting work-contacting signals from the auxiliary probe-head system for exclusive service of measurement functions.

11 Claims, 5 Drawing Sheets

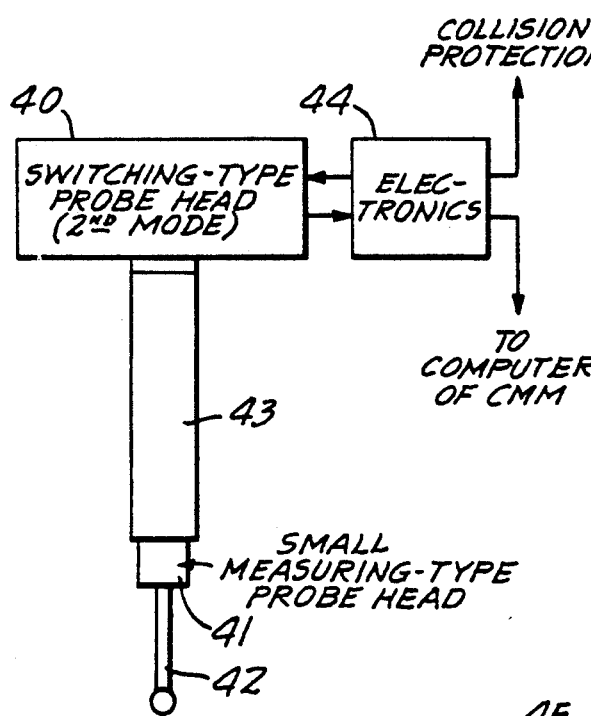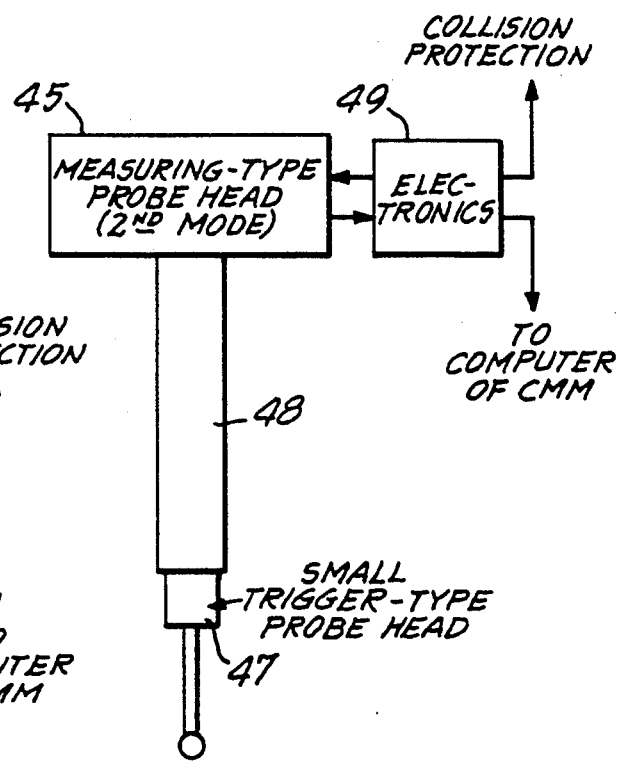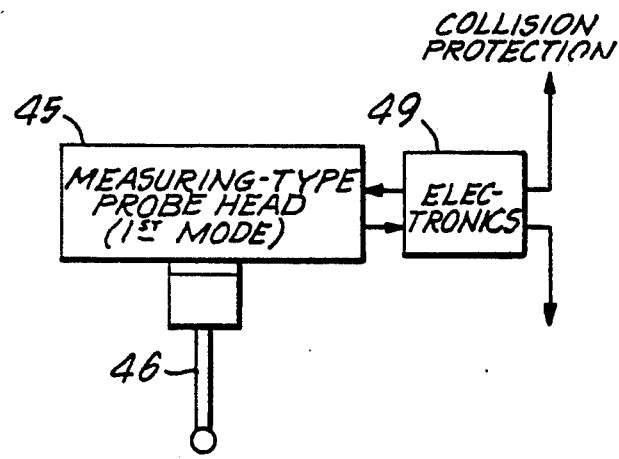

WORK-CONTACTING PROBE SYSTEM FOR A COORDINATE-MEASURING INSTRUMENT

This application is a continuation of patent application Ser. No. 234,510, filed Aug. 22, 2988, the same being scheduled for issue as U.S. Pat. No. 4,916,825, on Apr. 17, 1990.

BACKGROUND OF THE INVENTION

The present invention relates to a work-contacting probe system for a coordinate-measuring instrument, wherein a probe head supplies a work-contact signal and has a chuck for removable attachment of a selected one of a plurality of probe pins.

Probe heads of the switching type supply an output signal pulse at the instant when the shaped contact element of the probe pin of the probe head contacts the workpiece to be measured. A probe head of this type is illustratively described in U.S. Pat. No. 4,177,568. To increase the accuracy of workpiece-contact recognition, this known probe head has a piezoelectric sensor which is sensitive to very small contact force and thus responds to initial contact with the workpiece, by supplying a signal to retain the instantaneous measurement values of the instrument, namely, as instantaneously read from the measurement scales of the coordinate-measuring instrument. A second signal pulse is produced when the movable probe-pin holder moves out of its position of rest in the further course of the contacting movement. This second pulse serves to verify the first contact pulse and to discriminate from such irrelevant pulses as may be caused by machine vibrations.

Use of an adapter enables different probe-pin combinations to be selectively mounted to the movable chuck of this known probe-head, illustratively as described in U.S. Pat. No. 4,637,119, as well as in the present Assignee's Product Information Bulletin 60-20-027e, entitled "Probe Changing Systems" (Publication date III/85).

In spite of its versatility, this known probe system cannot satisfactorily solve all measurement tasks which are encountered in practice. For example, when a measurement task requires a very long or a very heavy probe-pin combination, a high starting or braking acceleration in the course of moving the probe head can momentarily dislodge the probe-pin adapter from its seated (chucked) position, thus erroneously simulating a contacting process.

To handle measurement tasks which require large probe-pin lengths, it is known to provide, in place of a central switching-type probe head which can carry a selected one of various probe-pin combinations, a plurality of small switching probe heads, each of which has only a very short probe pin; in turn, each of the small switching probe heads is mounted to the coordinate-measuring instrument, via suitable distributor or extension means. Such a probe system is known, for example, from West German Patent Application P 36 34 689.6 or from the corresponding pending U.S. Pat. Application Ser. No. 105,825 as well as from applicant's Assignee's "Information Brochure" (60-25-004e), in connection with the "Microtecnic 86" Exposition in Zurich, Switzerland, October 14 to 18, 1986. As can be noted from FIGS. 4 to 6 on Pages 12 and 13 of the said brochure, these small switching probe heads of smaller diameter are mounted on the coordinate-measuring instrument via a buckling (yieldable) point, for protection against collision damage. Collision protection is afforded by a collision-sensing switch which is connected to the control system of the coordinate-measuring instrument.

Such collision protection is, however, biased with relatively great spring force, as compared with bias of the probe-pin holder in a probe head of the first-mentioned type (e.g., as in U.S. Pat. No. 4,177,568). This is necessary in order to assure retention of the zero position of the currently mounted probe-head combination, with its relatively great mass, even if a relatively great rotational moment should act on the collision-protection device, as a result of an eccentric force application.

When a given system employs a large number of small switching probe heads, it becomes relatively expensive to provide collision protection for all heads, and the price of a thus-equipped coordinate-measuring instrument necessarily increases. Furthermore, a simple change between a single probe-head system and a multiple probe-head system is not possible since an entire multiple-head system, including all provision for its collision protection, must be removed if a single switching probe head is to be mounted in its place. Such conversions always mean subsequent recalibration of the involved probe system.

BRIEF STATEMENT OF THE INVENTION

It is the object of the present invention to provide an improved probe system of the first-mentioned type (i.e., a single probe head system) such that, at least expense, it is possible to accommodate even large probe-pin extensions and to operate with high speed.

The invention in a preferred form achieves this object (1) by providing an auxiliary switching-type probe head having reduced dimensions as compared with those of an installed single switching-type probe head, (2) by providing for the selective mounting of the auxiliary probe head to the probe-mounting system of the installed probe head, and (3) by providing for measuring-instrument reliance upon work-contact signals from the auxiliary probe head instead of those from the installed probe head, whenever the auxiliary probe head is thus mounted.

By these measures, advantages of the respective probe systems described in connection with the background of the invention are combined and, at the same time, a rapid change between the two systems is possible. Thus, for example, a switching centrally located probe head with which a large number of different measurement tasks can already be solved, can remain installed on the machine when changing to a system having a plurality of small switching probe heads and can provide for collision protection when equipped with an auxiliary probe head. The change to such a two-stage system an be easily effected without tedious work, in that, an existing probe-changing chucking adapter can be used to mount each auxiliary probe head, just as such an adapter is currently used to mount each one of a plurality of probe-pin configurations.

In furtherance of the foregoing, it is advantageous to integrate connecting contacts for the transmission of the work-contact signals from the auxiliary probe head into the mounting or chucking system in the installed probe head. These connecting contacts serve for transferring work-contacting signals from the auxiliary probe head to the measuring-machine cable system which already serves the installed probe head; and a profile or other recognition code may be a built-in feature of the connecting-contact system, whereby the computer of the measuring machine can automatically adapt its mode of operation to the operational parameters of a newly substituted auxiliary switching probe.

The installed central probe head is operated in conventional manner, with reliance upon its work-contact switching system, when installed with a rigid probe pin or probe-pin configuration. But upon substituting an auxiliary probe head and its probe pin or probe-pin configuration, the operational measuring mode of the instrument is automatically transferred to reliance upon the work-contact switching system of the auxiliary probe head. Also, upon substituting an auxiliary probe head for a rigid probe pin, a motor within the installed probe head is activated to reduce the switching sensitivity of the installed probe head, as by motor-driven preload of a spring-bias system, the reduction being to a level which will (1) allow all probe-derived work-contact signals to be recognized only via the switching means of the auxiliary probe head and which will (2) additionally provide a collision-protection feature for the auxiliary probe head. In the latter connection, i.e., when accommodating an auxiliary probe head, the switching-signal output of the installed probe head is advantageously forwarded to control means associated with the coordinate-measuring instrument for stopping the drive of the instrument in the event of a collision.

DETAILED DESCRIPTION OF A PREFERRED EMBODIMENT

The invention will be described in detail in conjunction with the accompanying drawings, in which:

FIG. 4a is a schematic showing of the second-mode arrangement of FIG. 2, with an auxiliary switching-probe head of FIG. 2;

FIG. 4b is a similarly schematic showing of a first-mode arrangement of a two-stage probe-head system involving a measuring-type probe head, with a rigid probe pin in place; and FIG. 4c is another schematic diagram, for a second-mode arrangement of the two-stage system of FIG. 4b, with an auxiliary switching-type probe head substituted for the rigid probe pin of FIG. 4b.

Figure 1:
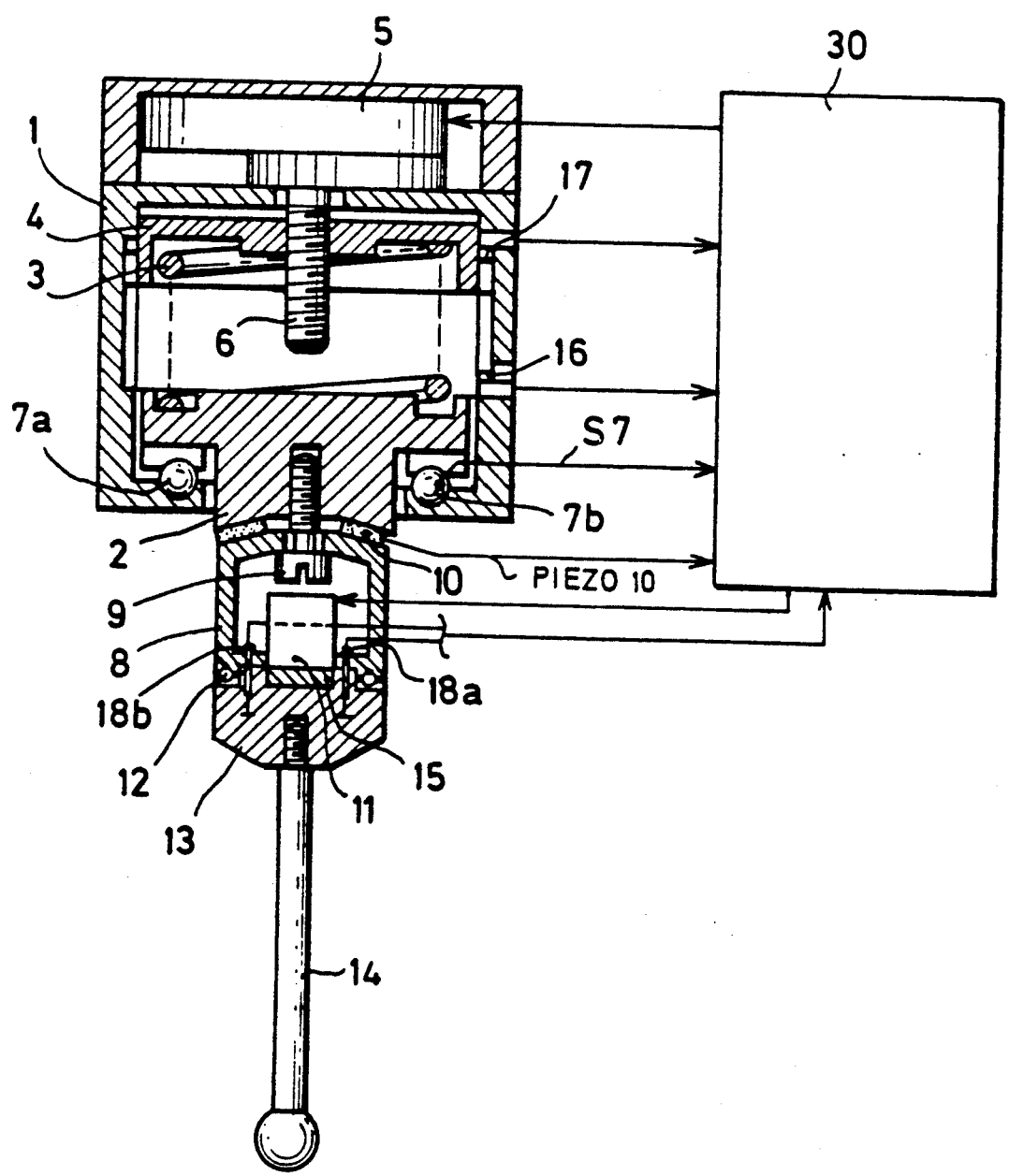
FIG. 1 is a simplified longitudinal section of a two-stage probe-head system of the invention, for a first mode of operation with a rigid probe pin in place.

In FIG. 1, the housing 1 of a central probe head will be understood to be mounted via suitable connecting elements (not shown), for example, to the movable spindle or crossarm of a coordinate-measuring instrument.

The housing 1 contains a three-point bearing for precise location of the at-rest position of the movable part 2 of the probe head; only two ball bearings 7a and 7b of this three-point bearing are shown, and the three bearing points will be understood to be equally spaced. The bearing balls and their seats form an electric switch which is closed only when movable part 2 is in its at-rest position; any break in an at-rest ball/seat engagement opens the switch and indicates a lifting of the movable part 2 out of its bearing. The electric connection to this switch is designated S7.

A spring 3 continuously urges the movable part 2 of the probe head toward seated relation with its bearing; and the compressional load of spring 3 on movable part 2 is adjustable via a motor 5 driving a spindle 6, which has threaded engagement to a seating plate 4 for the spring 3. Plate 4 is linearly guided in the housing 1, and the spindle-drive motor is mounted in the upper part of the housing.

Within housing 1, end limits of the region of spring (3) adjustment are marked by two microswitches 16 and 17, each of which is poised for actuation by plate 4.

A probe-receptacle 8 is mounted to the movable part 2 by attachment means, shown as a screw 9. A piezoelectric sensor 10 is interposed between the probe-pin receptacle 8 and the movable par 2, and the output signal of sensor 10 provides instant recognition of workpiece contact. Receptacle 8 contains an electromagnet 11 having a permanent-magnet core, forming a known chuck for interchangeable accommodation of a selected one of a plurality of probe pins. In FIG. 1, this known chucking device has magnetically reacted with a ferromagnetic-core part 15 of the mounting adapter 13 of a rigid probe pin 14, the reaction being that of magnetically drawing adapter 13 into position-locating engagement with three-point bearing means 12 at the bottom end of the probe-pin receptacle 8; reference is made to U.S. Pat. No. 4,637,119 for a more complete description of such magnetic-chucking means.

The probe-pin receptacle 8 is further shown with plural contact pins, as at 18a, and 18b to serve a function which will be described in connection with FIG. 2. When a rigid probe is introduced, as at 14 in FIG. 1, these contact pins 18a and 18b are connected to ground.

Figure 2:
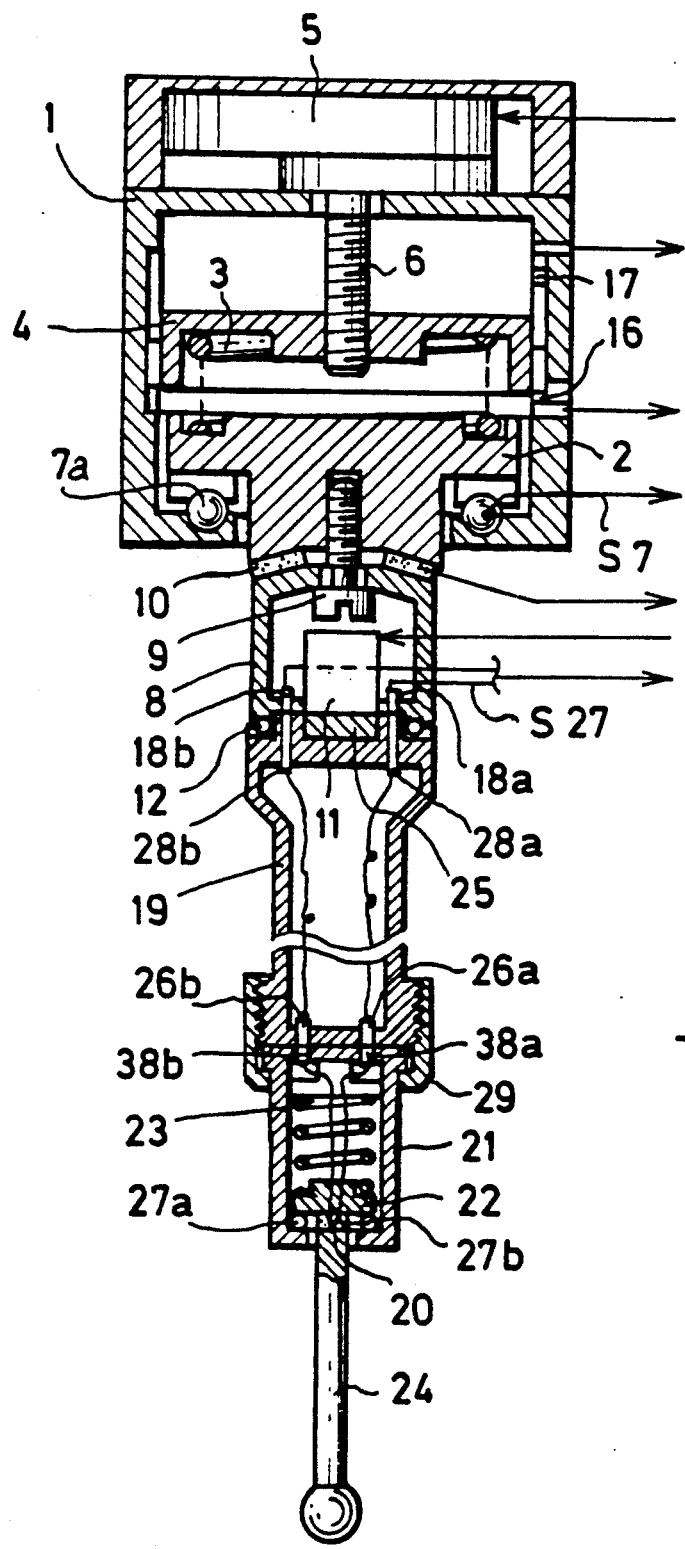
FIG. 2 is a similar view of the two-stage prove system of FIG. 1, for a second mode of operation, with an auxiliary switching probe head substituted for the rigid probe pin of FIG. 1.

In FIG. 2, a complete "small" switching probe head 21 is shown mounted, via an intermediate or extension member 19, to adapter 8 and its chucking means 11, in substitution for the rigid probe pin 14 of FIG. 1. Probe head 21 is of much smaller diameter than the probe head of FIG. 1 but has, in principle, the same construction as the probe head of FIG. 1. It has a movably mounted part 22 which is urged via a spring 23 against a three-point bearing which determines its zero or at-rest position. In this case also, the bearing balls 27(a, b) form a tilt-sensitive electric switch circuit. A probe pin 24 mounted to probe head 21 is connected to the movable part 22 via an interposed second piezoelectric sensor 20.

The probe head 21 is secured to the outer end of extension member 19, via threads of a cap nut 29. The other end of member 19 is provided with a ferromagnetic insert 25 and is held by magnet 11 of receptacle 8 of the central probe head 1, against bearing 12 of the probe-change device.

At its respective ends, extension member 19 has internally connected contacts 28 (a, b) and 26 (a, b) which conduct work-contact signals from probe pin 24 to mating contacts 18 (a, b) in the receptacle 8 of probe head 1.

In the showing of FIG. 1, spring 3 is in its partially relaxed condition and exerts only a slight force, for example 0.2 N, on part 2 of the probe-pin receptacle. In this spring position, probe head 1 acts in traditional manner as a switching probe head, the spring force being set to determine contact force exerted by probe pin 14 on the workpiece to be measured.

On the other hand, with the auxiliary switching probe head 21 inserted as shown in FIG. 2, the spring 3 in probe head 1 is more strongly compressed; illustratively, part 2 of the receptacle 8 will be loaded with a force of about 50 N into seated relation on its bearing 7. In this adjusted condition, probe head 1 will be understood to serve only the function of collision protection, i.e., part 2 disengages from the bearing when auxiliary probe head 21 or its extension member 19 is unintentionally driven against an obstacle. And work-contact signals and functions, for the adjusted situation of FIG. 2 derive only from probe pin 24 of the "small" auxiliary probe head 21.

Figure 3:
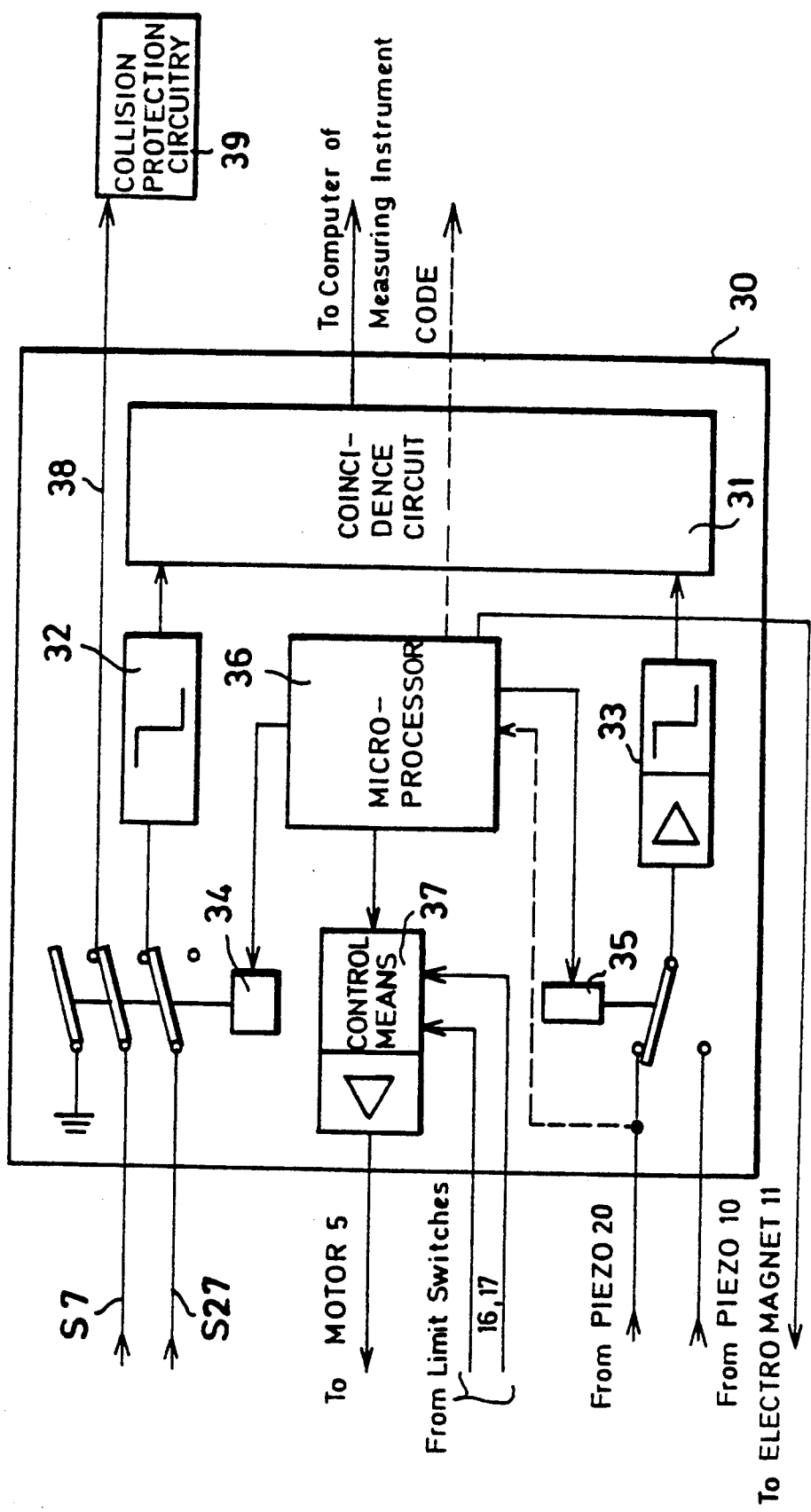
FIG. 3 is a block diagram of an electronic system adapted for selective use with the two-stage probe system of FIG. 1 and/or FIG. 2.

Necessary switching, as between the operational mode of FIG. 1 and the operational mode of FIG. 2, is effected by means of an electronic arrangement 30, having cable connections to the spring-adjusting motor 5, to the end-position limit switches 16 and 17 of loading the switching bearing 7, to the probe-change magnet 11, to the piezoelectric elements 10, 20, and to the contact pins 18 (a, b). The arrangement 30 is shown in FIG. 3 and will be described in connection with an overall operation of the probe system.

Arrangement 30 is seen to include control means 37 for reversible drive of motor 5 in probe head 1. Motor control means 37 is connected to a microprocessor system 36 and receives from the latter control signals for the adjusting of the compressional force of spring 3; the motor-control means 37 is further connected to the end-position limit switches 16 and 17 which report attainment of the respective limits of displacement for compressional adjustment of the spring.

Microprocessor 36 also controls separate relays 34 and 35 for switching of work-contact probe signals, as between reliance on a first-mounted pin 14 (FIG. 1) and reliance on a second-mounted pin 24 (FIG. 2). Relay 35 selectively connects the piezoelectric sensor 20 (of probe head 21) or the piezoelectric sensor 10 (of probe head 1) to the input of an amplifier and pulse-former stage 33. In the FIG. 1 mode of operation, relay 34 connects switch S7 of the bearing in probe head 1 to the input of a trigger stage 32; and, upon switching into the FIG. 2 mode of operation, relay 34 connects switch circuit S7 to collision-protection circuitry 39 of the coordinate-measuring instrument.

At the same time, circuit S27, which serves the switching bearing of auxiliary probe head 21, is connected to the input of a trigger circuit 32. The outputs of the circuits 33 and 32 are combined in a coincidence circuit 31, from which the actual work-contacting pulse sequence is forwarded as output to the computer of the coordinate-measuring instrument. Circuitry operating from such an output is known per se and is already part of the electronics of the probe head referenced as part of the background of the invention.

Control of the switching process, upon mode change (as between FIG. 1 and FIG. 2), can either be effected by the coordinate-measuring instrument via a connection (not shown) to microprocessor 36, or it can be initiated by the microprocessor itself, if provision is made for recognizing the newly changed and magnetically chucked structure. In FIG. 3, a cable connection (shown by dashed line) between piezoelectric sensor 20 and the microprocessor 36 suggests provision for such recognition, it being recalled that in the FIG. 1 mode, contacts 18 (a, b) of the base 13 of rigid probe 14 are shorted to ground, whereas in the FIG. 2 mode, contacts 18 (a, b) serve for transmission of work-contact signals; thus, it can be determined, as by microprocessor interrogation of the internal resistance of circuit S27, whether a rigid probe 14 or a small auxiliary switching probe head 21 has been mounted to receptacle 8.

FIG. 3 also suggests, by means of another dashed line output (labeled "CODE") from the microprocessor, that coding appropriate to the particular currently installed probe-pin or probe-head combination, as detected at the receptacle mounting of the particular combination, may be another data output to the computer of the coordinate-measuring machine.

Figure 2A:
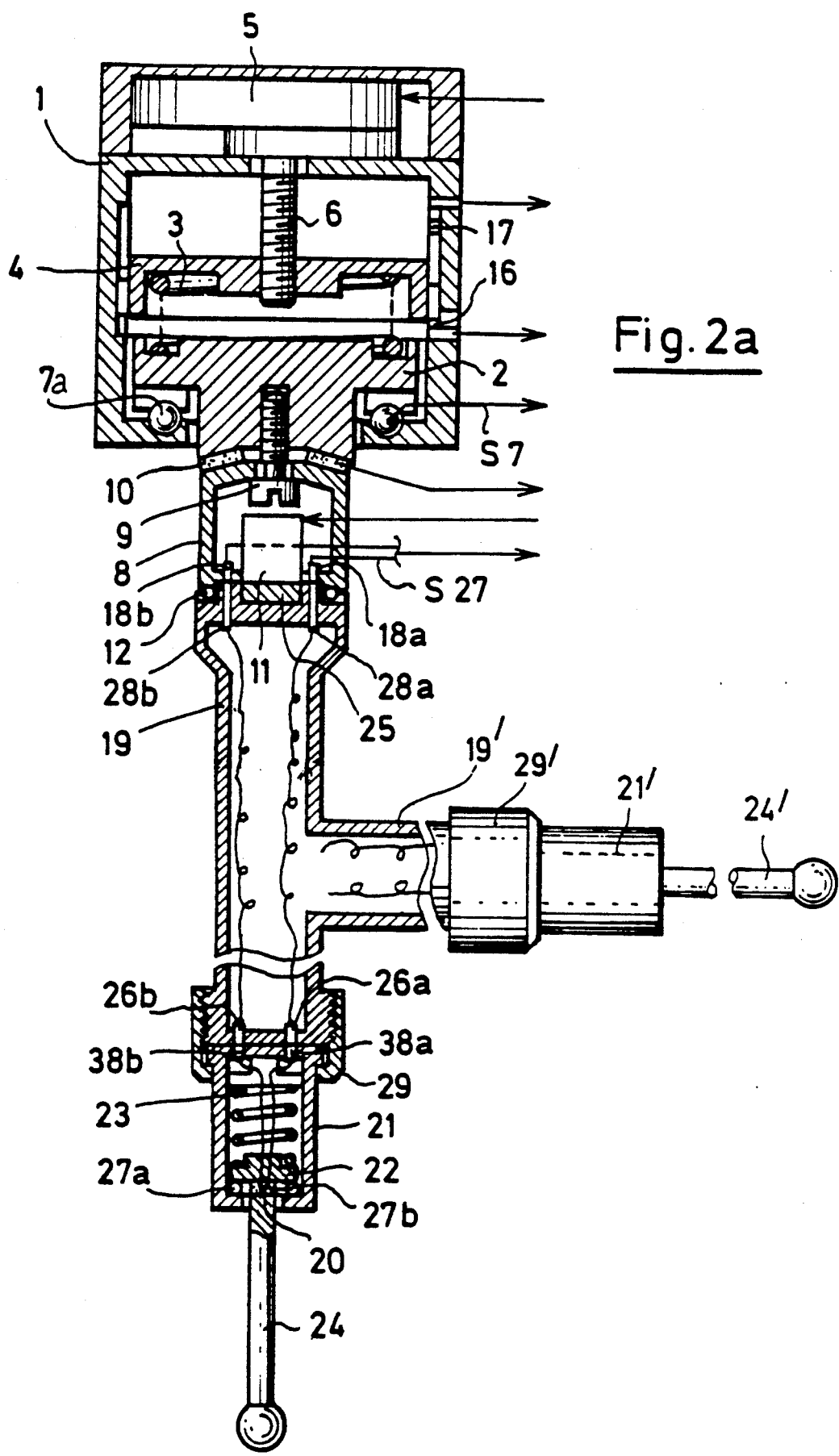
FIG. 2a is a view similar to FIG. 2 to show a modification.

Although FIG. 2 shows only a single "small" switching probe head 21 connected to the central probe head 1 via the extension member 19, it is clear that a plurality of small probe heads can interchangeably be chucked to probe head 1, when the connecting piece (19) is developed suitably as a multiple-arm distributor, reference being had to the disclosure of said pending U.S. Application Ser. No. 105,825. Such an arrangement is specifically suggested by FIG. 2a, wherein a second auxiliary probe head 21' (with a work-contacting probe pin 24') is attached by means 29' to a transverse arm 19' of extension member 19, it being understood that contact-pin and electronic provision (not shown) is available to accommodate electrical-signal output of this second auxiliary probe head 21'.

Furthermore, instead of the central switching probe head 1, the invention will be understood to be applicable to use of a probe head of the measuring type, or to use of universal probe head which can be optionally switched between two modes of operation, namely:
 a: use for obtaining of the probe signal, and
 b: use for collision protection, when a second probe head has been attached.

Finally, in reversal of this concept, it is also possible to attach a small measuring probe head to a central switching probe head.

The schematic diagrams of FIGS. 4a, b, c, will be seen as specific illustrations of these variations involving measuring-type probe-head operation. In FIG. 4a, a switching-type probe head 40, which may be as described in connection with probe head 1 of FIGS. 1 and 2, is shown connected for its second mode of operation, wherein an auxiliary probe head 41 (which may be a small measuring-type probe head, with its mounted probe pin 42) is replaceably attached to probe head 40 via an elongate tubular body member 43. Measurement signals developed by pin 42 in contact with a workpiece will be understood to be fed within body member 43 and its connecting electrical contacts to probe head 40, and thence to electronic signal-processing and control circuitry at 44, for output supply to the computer of the coordinate-measuring instrument and to collision-protection circuitry.

In the arrangement of FIG. 4b, the primary probe head 45 of the measuring instrument is of the measuring type, being shown in FIG. 4b to be connected for first-mode operation, wherein a rigid probe-pin element 46 is removably mounted to the measuring-type probe head. In FIG. 4c, the probe head 45 is shown connected for second-mode operation, by having replaced probe-pin element 46 with a small auxiliary probe head 47 which may also be a small measuring-type probe head (as in FIG. 4a) but which is shown by legend to be a trigger-type probe head, such as the piezo-sensitive trigger probe head 21 of FIG. 2. The auxiliary probe head 47 is shown removably attached to probe head 45 via an elongate tubular body member 48, and the electronic circuitry at 49 in FIGS. 4b and 4c is schematically shown as in FIG. 4a, serving functions equivalent to those of FIG. 4a, except for processing accommodation of output signals of measuring-type operation or switching-type operation, depending upon the applicable mode of operation.

What is claimed is:

1. A probe system for a coordinate-measuring instrument, comprising a first probe head having a movable part with receptacle means for interchangeable accommodation of a selected one of a plurality of rigid probe pins, said first probe head producing a first electrical signal in response to a condition of workpiece contact via a probe pin mounted to said receptacle means, and a second probe head for optional use in said system, said second probe head being adapted for selective mounting to said receptacle means, said second probe head having means producing a second electrical signal in response to a condition of workpiece contact, and associated electronics for delivering probe-signal outputs to said instrument, said electronics including switching means operative (a) in a first mode to deliver said first electrical signal as its work-contact output as long as said receptacle means accommodates a rigid probe pin, and (b) in a second mode to deliver said second electrical signal as its work-contact output as long as said receptacle means accommodates said second probe head.

2. A probe system for a coordinate-measuring instrument comprising a first probe head having first probe means including a movable part adapted for interchangeable attachment of a probe member, said first probe means producing first electrical signals in response to workpiece contact of a probe member attached to said movable part;

a second probe head adapted for interchangeable attachment to the movable part of said first probe means;

said second probe head having second probe means for producing second electrical signals in response to workpiece contact of a probe pin movably mounted to said second probe head; and electronic means connected to said first probe means in the circumstance of said probe member being attached to said movable part, said electronic means being connected to said second probe means in the circumstance of said second probe head being attached to said movable part, and said electronic means having output means for delivering output signals to said instrument.

3. The probe system of claim 2, wherein said second probe head is of the switching type and contains a contact-responsive sensor.

4. The probe system of claim 3, wherein said sensor is a piezoelectric sensor.

5. The probe system of claim 2, wherein said first probe head is of the switching type.

6. The probe system of claim 2, wherein said first probe head is of the measuring type.

7. The probe system of claim 5, wherein said second probe head is of the measuring type.

8. The probe system of claim 2, wherein both said probe heads are of the switching type.

9. The probe system of claim 2, wherein each of said heads includes a cylindrical housing and the diameter of the housing of said second probe head is less than the diameter of the housing of said first probe head.

10. A probe system for a coordinate-measuring instrument comprising a first probe head having first probe means including a movable part adapted for interchangeable attachment of a probe member, said first probe head in a first mode of operation producing first electrical signals in response to workpiece contact of a probe member attached to said movable part;

a second probe head adapted for interchangeable attachment to the movable part of said first probe means;

means responsive to attachment of said second probe head to said movable part for converting said first probe head to a second mode of operation wherein said first probe head provides a collision-protection signal;

said second probe head producing further electrical signals in response to workpiece contact of a probe pin movably mounted to said second probe head; and electronic means connected to said first probe head (a) for response to said first electrical signals when said first probe head is in said first mode of operation and (b) for response to said collision protection signal and to said further signals when said first probe head is in said second mode of operation.

11. The probe system of claim 2, wherein said first probe head includes force-applying means acting on said movable part, said force-applying means being selectively controllable by said electronic means to exert a lesser or a greater force on said movable part.

* * * * *